United States Patent [19]

Iwasaki et al.

[11] Patent Number: 5,721,645
[45] Date of Patent: Feb. 24, 1998

[54] OPTICAL INSTRUMENT WITH MOVABLE LENS BARREL

[75] Inventors: Hiroyuki Iwasaki; Yasuhiko Tanaka, both of Saitama, Japan

[73] Assignees: Fuji Photo Film Co., Ltd., Kanagawa; Fuji Photo Optical Co., Ltd., Saitama, both of Japan

[21] Appl. No.: 812,787

[22] Filed: Mar. 6, 1997

[30] Foreign Application Priority Data

Mar. 11, 1996 [JP] Japan .................................. 8-052940

[51] Int. Cl.⁶ .......................... G02B 7/02; G02B 15/14
[52] U.S. Cl. ................................ 359/823; 359/704
[58] Field of Search .............................. 396/348, 349; 359/817, 822, 823, 694, 699, 700, 702, 704

[56] References Cited

U.S. PATENT DOCUMENTS

| | | | |
|---|---|---|---|
| 5,037,187 | 8/1991 | Oda et al. | 359/699 |
| 5,345,283 | 9/1994 | Satoh et al. | 354/106 |
| 5,376,983 | 12/1994 | Yamazaki et al. | 354/195.12 |
| 5,515,205 | 5/1996 | Yokoyama et al. | 359/699 |
| 5,543,971 | 8/1996 | Nomura et al. | 359/697 |

*Primary Examiner*—David C. Nelms
*Assistant Examiner*—Ricky Mack
*Attorney, Agent, or Firm*—Young & Thompson

[57] ABSTRACT

A zoom camera has at least a rear movable lens barrel movable on an optical axis forwards and rearwards. The rear movable barrel is moved from a collapsed position forwards. Front and rear lens groups are disposed in the rear movable barrel. A lens holder is supported inside the rear movable barrel in a movable manner on the optical axis forwards and rearwards, and supports the rear lens group. Three cam pins and three cam grooves move the lens holder relative to the rear movable barrel. An extension coil spring causes force of pulling the lens holder, biases the lens holder rearwards, and absorbs backlash between the three cam pins and three cam grooves. A combination of a spring plate and an inner wall of the body the extension coil spring when the rear movable barrel is in the collapsed position, to disable the pulling force from occurring. The extension coil spring is extended to enable the pulling force to occur when the rear movable barrel is in front of the collapsed position.

19 Claims, 6 Drawing Sheets

OPTICAL INSTRUMENT WITH MOVABLE LENS BARREL

BACKGROUND OF THE INVENTION

1. Field of the Invention

The present invention relates to an optical instrument with a movable lens barrel. More particularly, the present invention relates to an optical instrument, such as a zoom camera, in which a lens holder inside a movable lens barrel can be set with reduced backlash of a cam mechanism.

2. Description Related to the Prior Art

A zoom camera has a zoom lens assembly in which two or more groups of lenses are individually moved for the purpose of varying a focal length. There is a zoom lens assembly of a so-called mechanical adjusting type, in which a cam mechanism of a non-linear structure is used for relative movement of the lens groups. The cam mechanism is constituted by a cam surface and a cam pin. The cam surface is formed on a movable lens barrel. The cam pin is disposed on a lens holder, and is engaged with the cam surface. When the movable barrel is rotated, the cam surface is shifted to move the lens holder relative to the movable barrel. In moving the lens holder, the cam pin is likely to have a deviation and error in the position relative to the cam surface according to the rotational direction of the movable barrel. To solve such a problem, there is a known backlash-reducing mechanism, which keeps the cam pin in constant contact with the one cam surface located on a side of one of two moving directions of the movable barrel. An example of the backlash-reducing mechanism includes an extension coil spring, which is favorable in low cost. The extension coil spring biases the lens holder toward a rear end of the movable barrel at the time of moving the movable barrel forwards from a collapsed position toward a wide-angle position.

It is desired to reduce a back-to-front thickness of a body of a camera. It is also desirable that all of the extension coil spring in the collapsed position should be contained in the thinly shaped camera body in view of good portability. If the camera body being thinned incorporates the backlash-reducing mechanism, there remains only a small space between the movable barrel standing in the collapsed position and an inner wall where an exposure aperture of the camera is located. Consequently the extension coil spring must have a small size enough to be contained. There is a shortcoming in that the extension coil spring having a determined length cannot have biasing force enough for operation of backlash reduction for the lens holder.

SUMMARY OF THE INVENTION

In view of the foregoing problems, an object of the present invention is to provide an optical instrument in which a lens holder can be biased sufficiently for biasing force enough for operation of backlash reduction even with an instrument body of which thickness is reduced and which incorporates a backlash-reducing mechanism.

In order to achieve the above and other objects and advantages of this invention, an optical instrument has a body, in which at least one first movable barrel is supported, and is movable on an optical axis in forward and rearward directions. At least a front lens group and a rear lens group are disposed in the first movable barrel and arranged on the optical axis. The first movable barrel is moved from a collapsed position in the forward direction. The optical instrument includes a lens holder, supported in the first movable barrel in a movable manner on the optical axis in the forward and rearward directions, for supporting the rear lens group. A holder moving mechanism moves the lens holder relative to the first movable barrel on the optical axis. An extension spring absorbs backlash of the holder moving mechanism, the extension spring causing force of pulling the lens holder to bias the lens holder in the rearward direction. A linking mechanism controls the extension spring in accordance with movement of the first movable barrel, the linking mechanism shortening the extension spring when the first movable barrel is in the collapsed position to disable the pulling force from occurring, and the linking mechanism extending the extension spring to enable the pulling force to occur when the first movable barrel is in front of the collapsed position according to the forward direction.

Furthermore, the first movable barrel is moved from the collapsed position to a first position, and then moved between the first position and a second position, the second position being defined furthest in the forward direction for the first movable barrel.

A first barrel moving mechanism moves the first movable barrel on the optical axis relative to the body, the holder moving mechanism moving the lens holder in response to operation of the first barrel moving mechanism.

The holder moving mechanism includes a cam pin and a cam surface, and a first one of the cam pin and the cam surface is positioned in front of a second one of the cam pin and the cam surface according to the forward direction, and is pressed against the second one by the extension spring.

In a preferred embodiment, the linking mechanism includes a spring plate, the spring plate having a fixed end and a free end, the fixed end being secured behind the first movable barrel according to the rearward direction, the free end contacting an inner wall of the body when the first movable barrel is set in the collapsed position, to come nearer to the first movable barrel, the extension spring being connected between the spring plate and the lens holder.

In another preferred embodiment, the linking mechanism includes a compression coil spring, and a shielding plate, disposed behind the first movable barrel according to the rearward direction, supported in a movable manner, and biased by the compression coil spring in the rearward direction, the extension spring being connected between the shielding plate and the lens holder.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
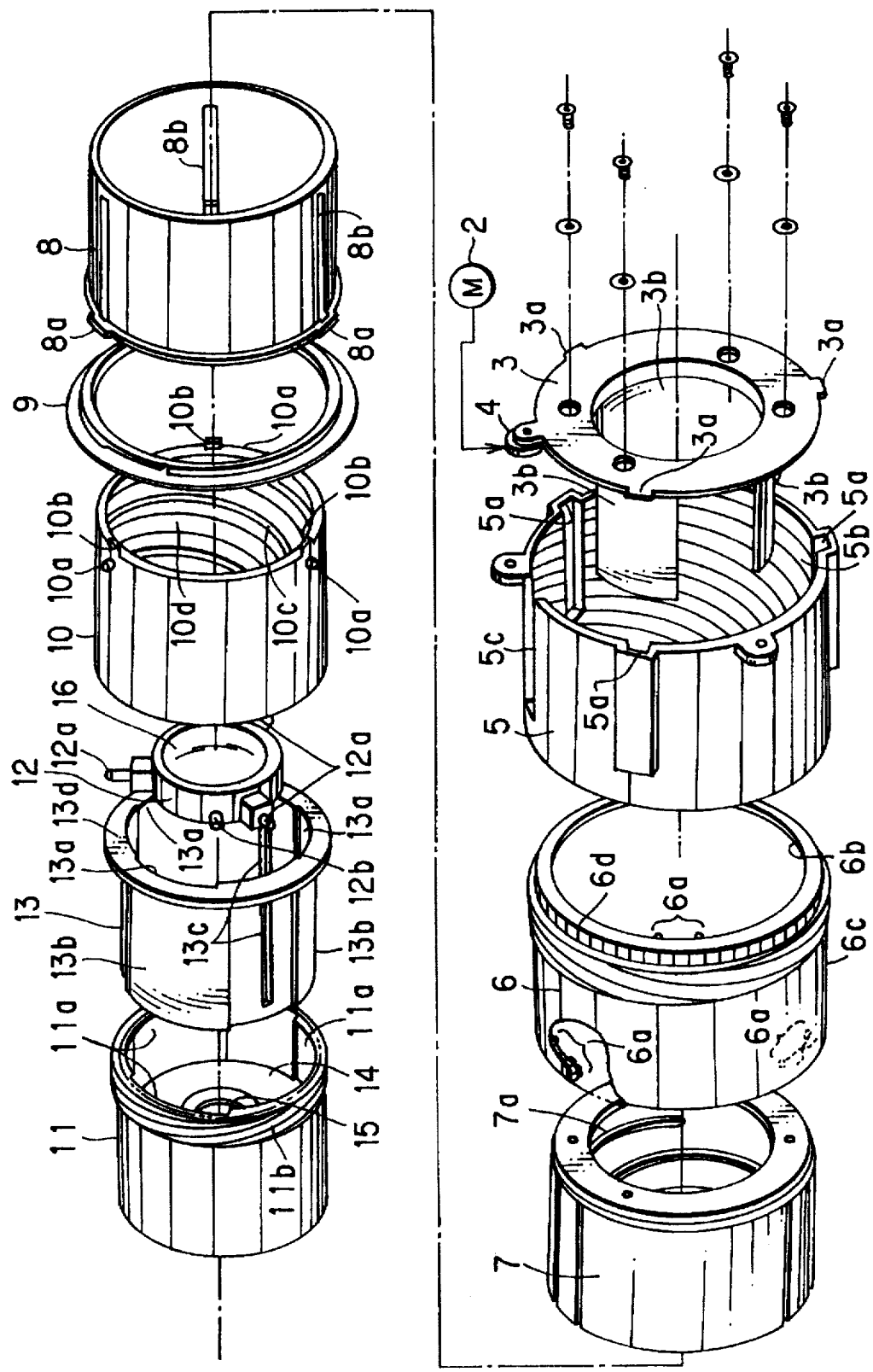
FIG. 1 is an exploded perspective illustrating a zoom lens assembly of a zoom camera.

In FIG. 1, a zoom lens assembly is constituted by a rectilinear keyed ring 3, a stationary barrel 5, a rear movable barrel 6, a rectilinear cam barrel 7, a rotatable barrel 8, a front ring 9, a middle movable barrel 10, a front movable barrel 11, a lens holder 12 and a rectilinear barrel 13. The stationary barrel 5 is stationary in a camera body 1. In the front movable barrel 11 are supported a front lens group 15 and a shutter device 14. The shutter device 14 is structurally a type of lens shutter. In the lens holder 12 is supported a rear lens group 16. The zoom lens assembly is constructed as a three-step type in which the rear movable barrel 6, the middle movable barrel 10 and the front movable barrel 11 are protruded in a stair-stepped shape from the front of the stationary barrel 5 along a photographic optical axis. This is for the purpose of consistency of a compact size of a zoom camera in a collapsed position and changeability to high magnification of the zoom lens system.

The inside of the stationary barrel 5 has a helical internal thread 5b and three key ways 5a. The key ways 5a are oriented in a direction parallel with the optical axis. The periphery of the rear of the rear movable barrel 6 has a helical external thread 6c, which is in mesh with the internal thread 5b. The rectilinear cam barrel 7 is inserted into the rear movable barrel 6. The rectilinear keyed ring 3 is secured to the rear of the rectilinear cam barrel 7 by fixing screws into holes. The rear movable barrel 6 has an inner flange 6b, which is supported in a rotatable manner between the rectilinear keyed ring 3 and the rectilinear cam barrel 7 which are secured together. The rectilinear keyed ring 3 has three key projections 3a, which are engaged with the key ways 5a of the stationary barrel 5 to keep the rectilinear keyed ring 3 from rotating.

In short, all of the rectilinear keyed ring 3, the rear movable barrel 6 and the rectilinear cam barrel 7 are movable together in parallel with the optical axis. The rear movable barrel 6 is rotatable, whereas the rectilinear keyed ring 3 and the rectilinear cam barrel 7 are kept from rotating.

An inner edge of the rectilinear keyed ring 3 has three key tongues 3b which are straight in directions parallel to the optical axis. The rectilinear keyed ring 3 also has a transmission pinion 4, to which rotation of a motor 2 inside the camera body 1 is transmitted by a train of speed reducing gears. The transmission pinion 4 is inserted in an opening 5c, which is formed straight in the stationary barrel 5. The transmission pinion 4 is in mesh with a gear portion 6d, which is formed about a rear of the rear movable barrel 6. The rear movable barrel 6 is moved in parallel with the optical axis while the rear movable barrel 6 is caused to rotate by rotation of the transmission pinion 4. During the movement of the rear movable barrel 6, the rectilinear keyed ring 3 is moved in parallel with the optical axis with the rear movable barrel 6. The transmission pinion 4 is moved in a longitudinal direction of the opening 5c of the stationary barrel 5.

The rotatable barrel 8 is inserted into the rectilinear cam barrel 7. The periphery of the front of the rotatable barrel 8 has three projections 8a. The inside of the front of the rear movable barrel 6 has engaging projections 6a, with which the projections 8a are engaged in a fixed manner. The rotatable barrel 8 is both movable and rotatable together with the rear movable barrel 6. The front ring 9 is secured to the front of the rear movable barrel 6 in a fixed manner. The front ring 9 is a cover for rendering appearance of the front neat. Also, the front ring 9 is secured to the front of the rotatable barrel 8 in a fixed manner. There are three guide slots 8b formed through the wall of the rotatable barrel 8 to extend in parallel with the optical axis. The inside of the rectilinear cam barrel 7 has three cam grooves 7a in helical shapes as cutouts without coming through the wall of the rectilinear cam barrel 7. The cam grooves 7a respectively have a cam surface.

The middle movable barrel 10 is inserted in the rotatable barrel 8. The rear of the middle movable barrel 10 has three cam pins 10a protruded in radial directions vertical to the optical axis. The cam pins 10a are inserted through the guide slots 8b in the rotatable barrel 8, engaged with the guide slots 8b, and also engaged with the cam grooves 7a of the inside of the rectilinear cam barrel 7. By the virtue of the cam pins 10a, rotation of the rotatable barrel 8 causes the middle movable barrel 10 to rotate, and causes the middle movable barrel 10 to move in parallel with the optical axis by following the direction of the cam grooves 7a in the rectilinear cam barrel 7.

The inside of the middle movable barrel 10 has a helical internal thread 10c and three cam grooves 10d. The cam grooves 10d have the rear edge which is a cam surface. The rectilinear barrel 13 is inserted into the middle movable barrel 10 through its rear. The inside of the rectilinear barrel 13 has three key ways 13a as recesses. The key tongues 3b of the rectilinear keyed ring 3 are respectively engaged with the key ways 13a, so as to keep the rectilinear barrel 13 from rotating. There is a ring-like groove (not shown) formed in a front wall of a rear flange 13d of the rectilinear barrel 13. Engaging projections 10b protrude rearwards on the rear of the middle movable barrel 10. The engaging projections 10b are engaged with the ring-like groove of the rectilinear barrel 13, so that the rectilinear barrel 13 is rotatable with respect to the middle movable barrel 10. Although the middle movable barrel 10 is rotatable, the rectilinear barrel 13 does not rotate, but is movable together with the middle movable barrel 10 in parallel with the optical axis. There are three rectilinear slots 13c formed through the wall of the rectilinear barrel 13 and in parallel with the optical axis.

The front movable barrel 11 is inserted in a cylindrical gap formed inside the middle movable barrel 10 and outside the rectilinear barrel 13. A helical external thread 11b is formed outside the front movable barrel 11, and is in mesh with the internal thread 10c inside the middle movable barrel 10. Three key ways 11a are formed in the inside of the front movable barrel 11, and shaped as cutouts long and straight in parallel with the optical axis. Three key portions 13b are formed on the outside of the rectilinear barrel 13, and shaped as ridges between the key ways 13a and straight in parallel with the optical axis. The key ways 11a respectively receive the key portions 13b to keep the front movable barrel 11 slidable but not rotatable. The front movable barrel 11 is movable back and forth and straight by following the lead of the internal thread 10c with rotation of the middle movable barrel 10.

The periphery of the lens holder 12 has three cam pins 12a protruded in radial directions vertical to the optical axis. The cam pins 12a are inserted through the rectilinear slots 13c in the rectilinear barrel 13, engaged with the rectilinear slots 13c, and also engaged with the cam grooves 10d of the inside of the middle movable barrel 10. By the virtue of the cam pins 12a, rotation of the middle movable barrel 10 causes the lens holder 12 to move in parallel with the optical axis by following the direction of the cam grooves 10d in the middle movable barrel 10, while the lens holder 12 is kept from rotating by the rectilinear slots 13c.

It is to be noted that the cam grooves 10d have a zigzag shape in addition to the generally helical shape. The zigzag shape operates for the purpose of focusing.

Figure 2:
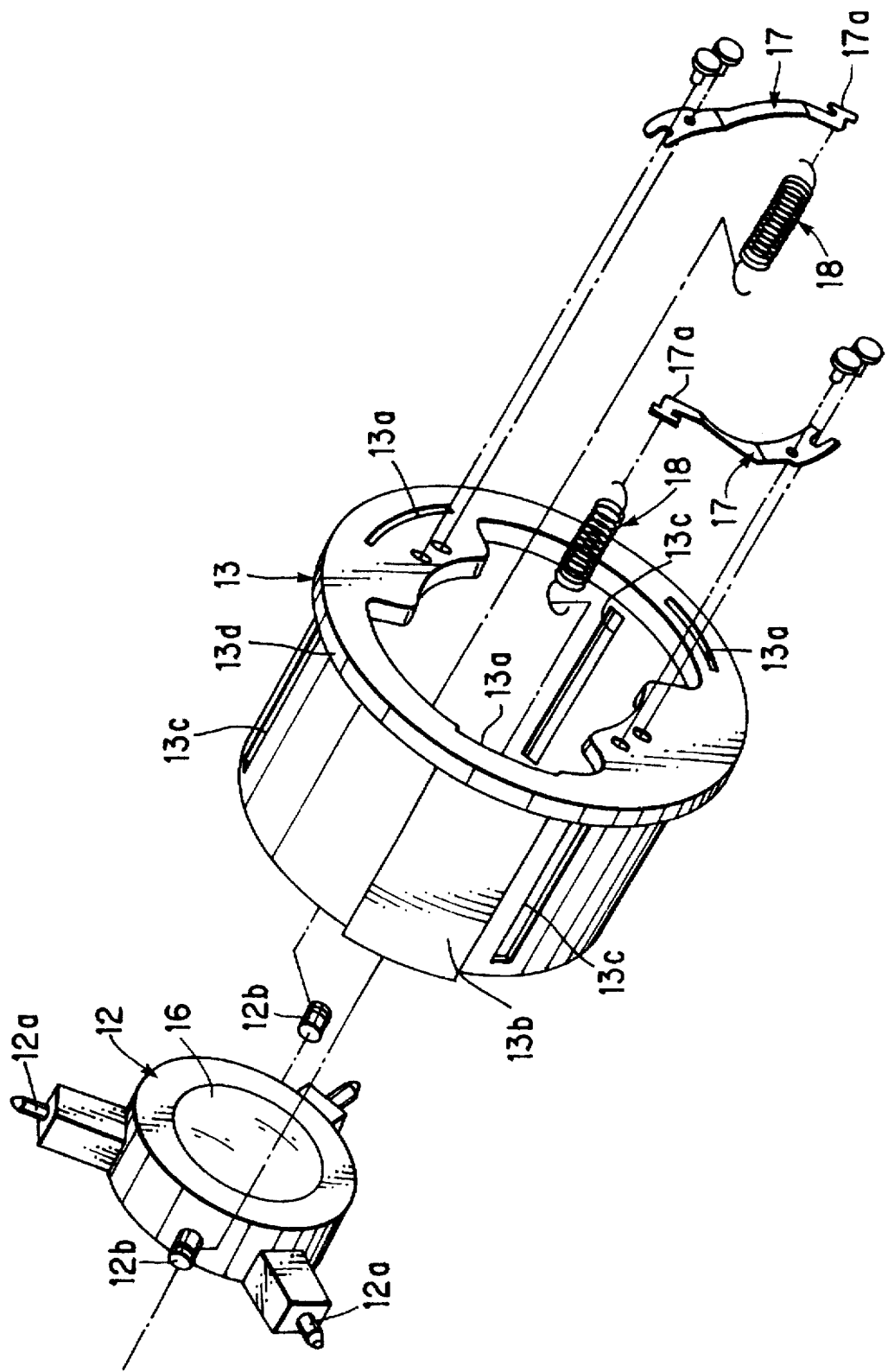
FIG. 2 is an exploded perspective illustrating a rectilinear barrel and a lens holder with springs.

In FIG. 2, the rectilinear barrel 13, which is movable with the middle movable barrel 10, is illustrated. There are a pair of spring plates 17 and a pair of extension coil springs 18, all secured to the rear of the rectilinear barrel 13. The spring plates 17 or subsidiary resilient members are shaped like an arc following the inside of the rectilinear barrel 13. A fixed end of the spring plates 17 is secured to the rear of the rectilinear barrel 13. A free end of the spring plates 17 is inclined rearwards and away from the rectilinear barrel 13. A first end of the extension coil springs 18 is secured respectively to spring receiving pins 12b, which are disposed on the periphery of the lens holder 12 and in rotationally opposite positions. A second end of the extension coil springs 18 is secured to the free end of the spring plates 17, which ends operate as a connective point 17a. The lens holder 12 is biased rearwards inside the rectilinear barrel 13. The position of the connective point 17a of the spring plates 17 being inclined is determined according to such a length of the extension coil springs 18 that the extension coil springs 18 sufficiently keep the cam pins 12a pressed against a rear one of the edges of the cam grooves 10d.

In short, a first barrel moving mechanism for moving the rear movable barrel 6 is constituted by the motor 2, the transmission pinion 4, the internal thread 5b, the external thread 6c and the gear portion 6d. A second barrel moving mechanism for moving the middle movable barrel 10 is constituted by the rectilinear keyed ring 3, the key projections 3a, the key ways 5a, the rectilinear cam barrel 7, the cam grooves 7a, the guide slots 8b and the cam pins 10a. A third barrel moving mechanism for moving the front movable barrel 11 is constituted by the key tongues 3b, the internal thread 10c, the key ways 11a, the external thread 11b, the key ways 13a and the key portions 13b. A holder moving mechanism is constituted by the key tongues 3b, the cam grooves 10d, the cam pins 12a, the key ways 13a and the rectilinear slots 13c.

Figure 3:
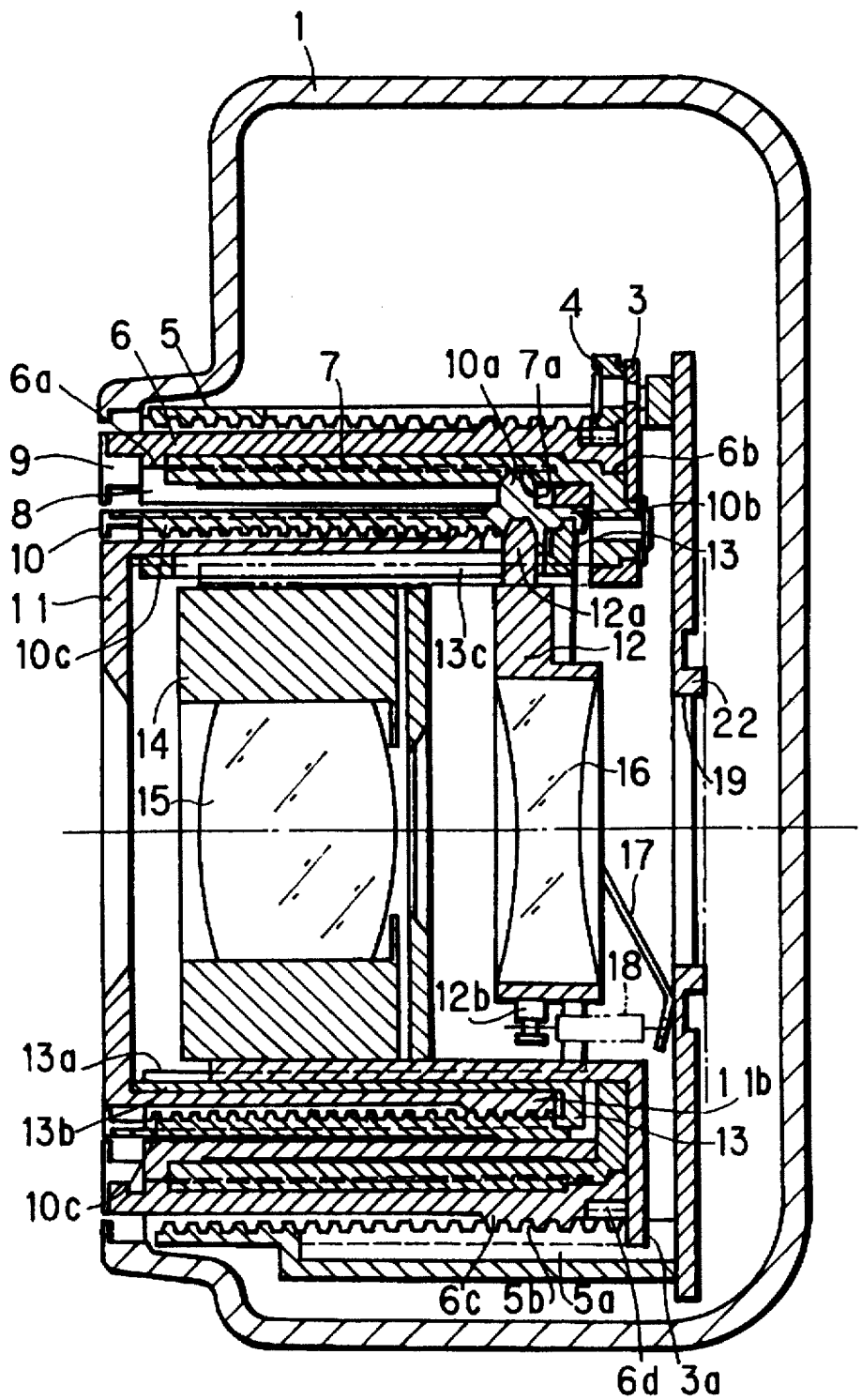
FIG. 3 is a cross section illustrating the zoom camera in a collapsed position.

The operation of the above construction is described now. FIG. 3 illustrates the collapsed position of the zoom lens assembly of the zoom camera. The camera body 1 of the zoom camera is containing all of the front movable barrel 11, the middle movable barrel 10 and the rear movable barrel 6. The connective point 17a of the spring plates 17 contacts an inner wall 22 of the camera body 1 where an exposure aperture 19 is formed, so that the spring plates 17 is bent by the inner wall 22 and shifted in the forward direction. The extension coil springs 18 are shortened because the rear end of the extension coil springs 18 is shifted forwards.

When a power switch of the zoom camera is operated, the motor 2 is driven. The rotation of the motor 2 is transmitted to the transmission pinion 4, which rotates the rear movable barrel 6. Responsively the rotatable barrel 8 and the middle movable barrel 10 are rotated.

When the rear movable barrel 6 is rotated, the rear movable barrel 6 moves forwards relative to the stationary barrel 5 by following the lead of the internal thread 5b and the external thread 6c. The rectilinear cam barrel 7 and the rotatable barrel 8 are moved forwards together. In the middle movable barrel 10, the cam pins 10a move respectively in the cam grooves 7a of the rectilinear cam barrel 7, so that the middle movable barrel 10 moves forwards to an extent further than that of the rectilinear cam barrel 7.

When the middle movable barrel 10 is moved forwards, the front movable barrel 11, the rectilinear barrel 13 and the lens holder 12 are moved forwards together. As the middle movable barrel 10 rotates, the front movable barrel 11 is moved forwards to a greater extent according to the lead of the internal thread 10c inside the middle movable barrel 10. The lens holder 12 is moved inside the rectilinear barrel 13 according to the shape of the cam grooves 10d and set in a magnification-determined in-focus position according to a moving amount of the front lens group 15. The zoom lens assembly is set in a wide-angle terminus position.

Figure 4:
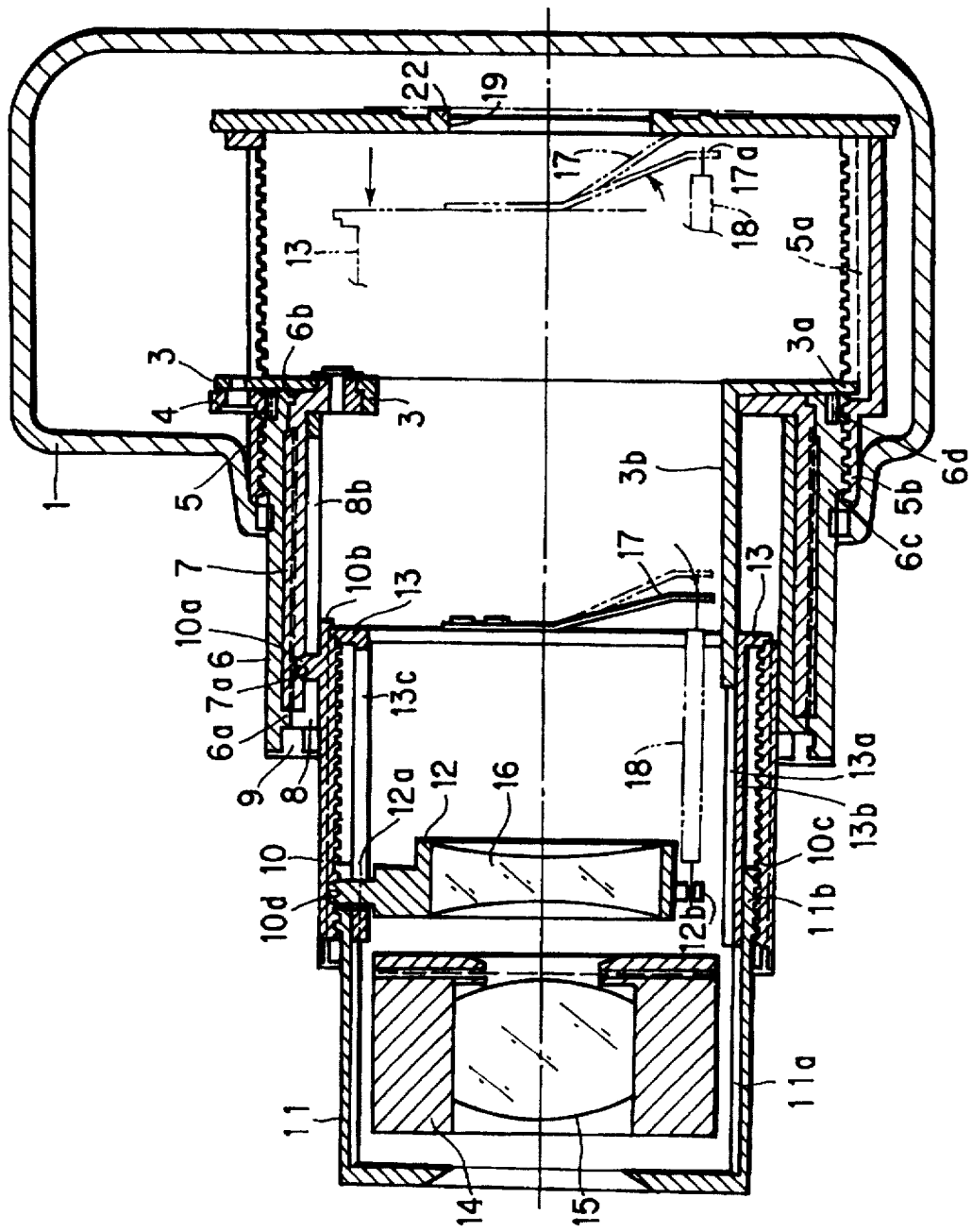
FIG. 4 is a cross section illustrating the zoom camera in a telephoto position.

In the wide-angle terminus position, the rectilinear barrel 13 is moved forwards relative to the inner wall 22 about the exposure aperture 19 of the camera body 1. In FIG. 4, the right-hand phantom lines indicate the spring plates 17 which are returned in the direction of lengthening the extension coil springs 18. The extension coil springs 18 are extended to their determined length. It is possible reliably to absorb rear backlash of the cam mechanism for the lens holder 12.

In the course of moving the zoom lens assembly in a telephoto direction toward a telephoto terminus position, the lens holder 12 is moved forwards with respect to the rectilinear barrel 13. The interval between the spring plates 17 and the lens holder 12 is increased over the determined length of the extension coil springs 18. If it were not for the spring plates 17, the lens holder 12 would receive excessive load beyond performance of the lens holder 12. But the force of the extension coil springs 18 comes over that of the spring plates 17. The spring plates 17 are flexed in a forward direction which is a direction of shortening the extension coil springs 18. Accordingly the lens holder 12 does not receive any excessive load. In the course of moving the zoom lens assembly in a wide-angle direction toward the wide-angle terminus position, the lens holder 12 is again kept in a state of rearward reduction of backlash by the virtue of the extension coil springs 18. When the power switch of the zoom camera is turned off, the extension coil springs 18 and the lens holder 12 return to the state of the collapsed position.

Figure 5:
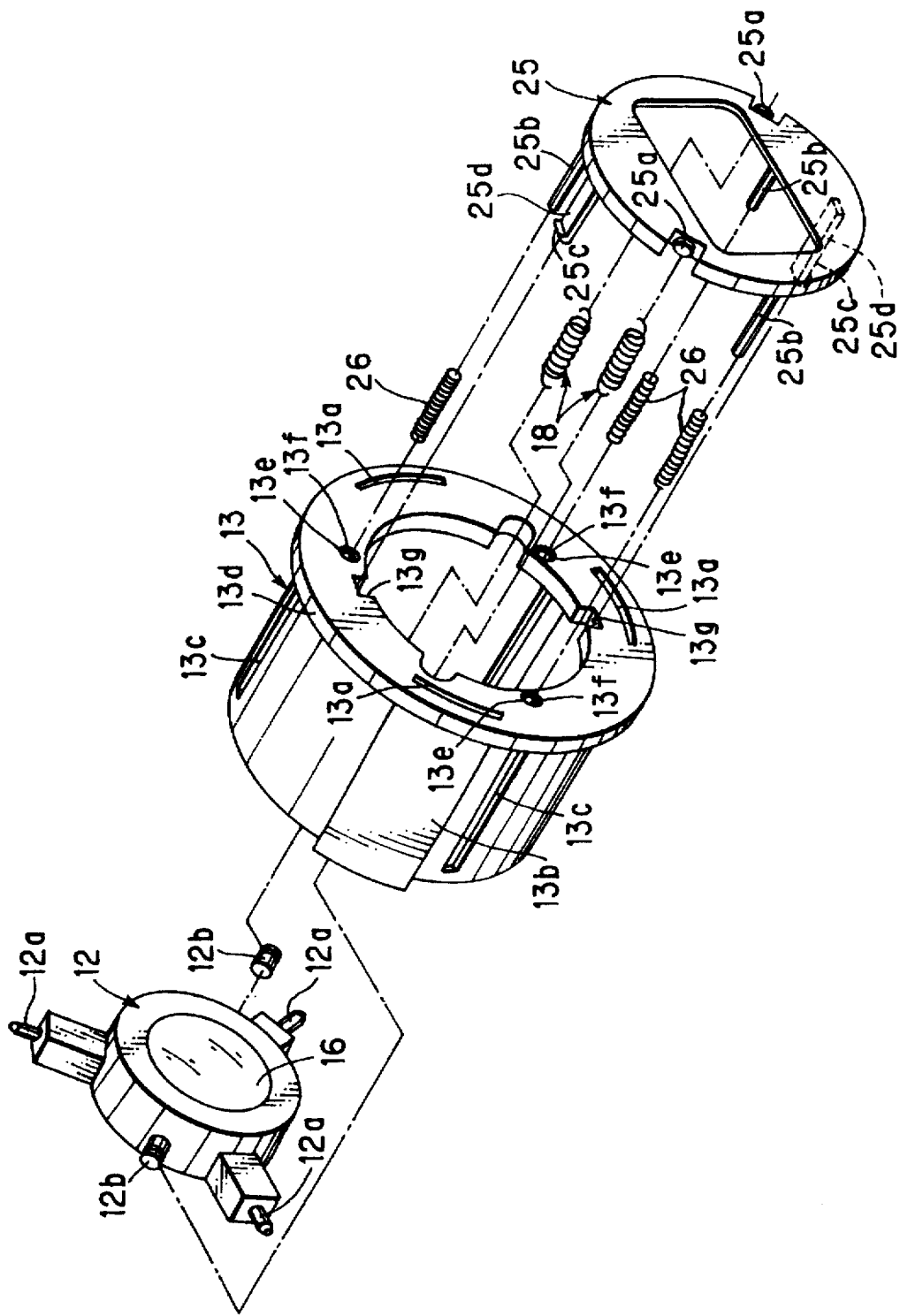
FIG. 5 is an exploded perspective illustrating another preferred embodiment having a variant rectilinear barrel.

In the above embodiment, the spring plates 17 are used as subsidiary resilient members. Alternatively it is possible in the present invention to use other structures of subsidiary resilient members. In FIG. 5, behind the rectilinear barrel 13 is disposed a shielding plate 25 for shielding harmful ambient light. Spring receiving pins 25a are arranged on the periphery of the shielding plate 25. The first end of the extension coil springs 18 is secured respectively to spring receiving pins 25a.

Three slide shafts 25b are disposed on the front of the shielding plate 25 to extend forwards. Three slide holes 13f are formed in the rear of the rectilinear barrel 13 and positioned at respective centers of circular recesses 13e. The slide holes 13f respectively receive insertion of the slide shafts 25b, and support the shielding plate 25 in a slidable manner in parallel with the optical axis. Three compression coil springs 26 or subsidiary resilient members are disposed between the rectilinear barrel 13 and the shielding plate 25 to receive insertion of the slide shafts 25b. The compression coil springs 26 have a front end in contact with the circular recesses 13e and a rear end in contact with the front of the shielding plate 25, and bias the shielding plate 25 rearwards. The biasing force of the compression coil springs 26 when having a free state is set greater than that of the extension coil springs 18 having the determined length.

The top and the bottom of the shielding plate 25 have respective rods 25d which extend forwards to the rectilinear barrel 13. The rods 25d have respective stopper claws 25c protruding in the radial directions. The stopper claws 25c are engaged with respective engaging notches 13g in the rear of the rectilinear barrel 13, and prevent the shielding plate 25 from removal of the shielding plate 25 from the rectilinear barrel 13. In the position where the extension coil springs 18 have the determined length, the stopper claws 25c limit the slide of the shielding plate 25.

Figure 6A:
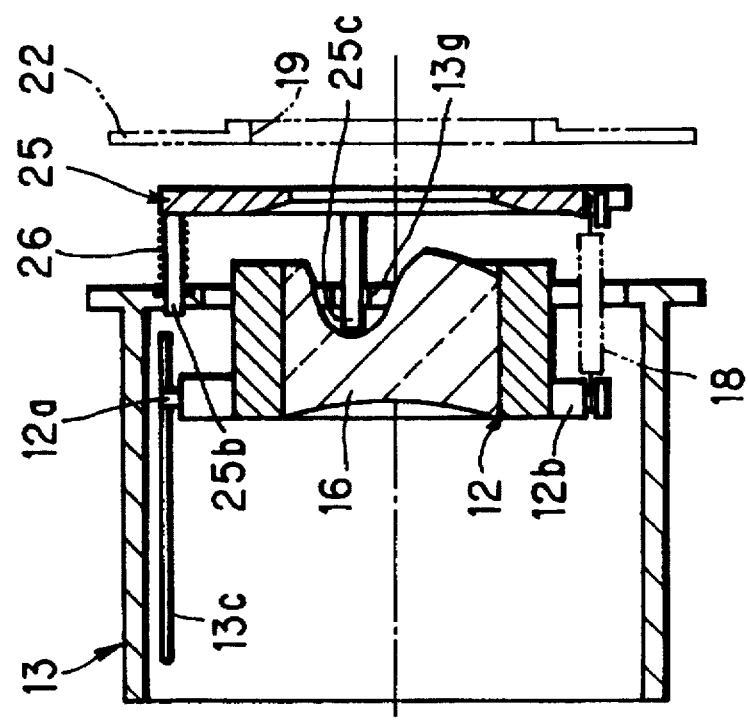
FIG. 6A is a cross section illustrating the rectilinear barrel in the collapsed position.

When the rectilinear barrel 13 is in the collapsed position, the shielding plate 25, as depicted in FIG. 6A, contacts the inner wall 22 inside the camera body where the exposure aperture 19 is located, and is moved against the bias of the compression coil springs 26. In the movement, the slide shafts 25b are guided by the slide holes 13f. The extension coil springs 18 are shortened. The shielding plate 25 is located nearer to the rectilinear barrel 13.

Figure 6B:
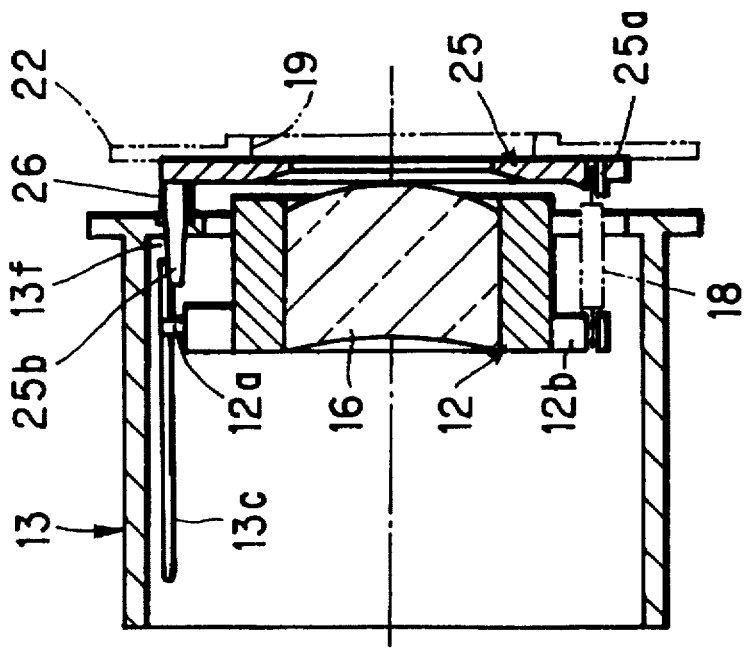
FIG. 6B is a cross section illustrating the rectilinear barrel in a wide-angle position.

When the rectilinear barrel 13 is moved forwards toward the wide-angle terminus position, the rectilinear barrel 13 is away from the inner wall 22 of the camera body having the exposure aperture 19 as illustrated in FIG. 6B. The shielding plate 25 is moved by the compression coil springs 26 in the direction of extending the extension coil springs 18. The movement of the shielding plate 25 is stopped upon engagement of the stopper claws 25c with respective engaging notches 13g. When the rectilinear barrel 13 is in the wide-angle terminus position, the stopper claws 25c are engaged with the engaging notches 13g. The shielding plate 25, while the zoom lens assembly is in a position between the wide-angle terminus and the telephoto terminus, operates to shield a photographic light path from ambient light incident upon the rear of the zoom camera. The extension coil springs 18 are extended to the determined length. The lens holder 12 is kept in the state of rearward reduction of backlash by the virtue of the extension coil springs 18. The rear backlash of the cam mechanism for the lens holder 12 can be absorbed reliably.

When the rectilinear barrel 13 is moved in the telephoto direction, the shielding plate 25 moves together with the rectilinear barrel 13 by engagement of the stopper claws 25c with the engaging notches 13g. The lens holder 12 is moved inside the rectilinear barrel 13 forwards according to the shape of the cam grooves 10d. An interval between the shielding plate 25 and the lens holder 12 increases. As the biasing force of the compression coil springs 26 when having the free state is set greater than that of the extension coil springs 18 having the determined length. The shielding plate 25 is not pulled toward the rectilinear barrel 13 beyond a position.

In the above embodiments, the inner wall 22 of the camera body operates in contact with the connective point 17a of the spring plates 17 or the shielding plate 25. The present invention is applicable to a construction in which the connective point 17a of the spring plates 17 or the shielding plate 25 contacts the stationary barrel, or contacts one of the barrels which returns to the collapsed position before the movable barrel associated with the lens holder 12, instead of the inner wall 22 of the camera body.

In the collapsed position, the extension coil springs 18 are pressed and shortened in a compressed form. The present invention is applicable to a construction in which the extension coil springs 18 are not compressible in a range below their length of the free state, but is shortened in a loosely curved manner when the rear end of the extension coil springs 18 is moved forwards.

In the above embodiments, the guide slots 8b are formed in the rotatable barrel 8 to come through it. The cam grooves 7a are formed in the rectilinear cam barrel 7 with bottoms without coming through it. The present invention is applicable to a zoom lens assembly having a cam mechanism of which the cam grooves are formed in the rotatable barrel 8 to come through it, and the straight grooves are formed in the rectilinear cam barrel 7 with bottoms without coming through it.

In the above embodiments, the zoom camera is constructed as a three-step type in which the three groups of the movable lens barrels are protruded forwards in a stair-stepped shape. The present invention is also applicable to a zoom camera constructed as a two-step type in which two groups of movable lens barrels are protruded forwards in a stair-stepped shape.

The above embodiments are directed to the zoom camera in which a focal length is variable. The present invention is also applicable to a camera of which a focal length is fixed without zooming structure, and of which a movable lens barrel is movable only from a collapsed position to an effective position for the use of the camera.

The above zoom lens assembly is incorporated in the zoom camera. The present invention is applicable to a video camera, a photographic printer, a movie camera, a motion picture projector, and any optical instrument having a movable lens barrel and a lens holder.

In the above embodiment, the holder moving mechanism includes the three cam pins 12a and three cam grooves 10d. It is also possible in the present invention that an alternative lens holder has a helical external thread, which is inserted in a helical internal thread similar to the cam grooves 10d, for the purpose of moving the lens holder.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical instrument, having a body, in which at least one first movable barrel is supported, and is movable on an optical axis in forward and rearward directions, at least a front lens group and a rear lens group are disposed in said first movable barrel and arranged on said optical axis, said first movable barrel is moved from a collapsed position in said forward direction, said optical instrument comprising:

a lens holder, supported in said first movable barrel in a movable manner on said optical axis in said forward and rearward directions, for supporting said rear lens group;

a holder moving mechanism for moving said lens holder relative to said first movable barrel on said optical axis;

an extension spring for absorbing backlash of said holder moving mechanism, said extension spring causing force of pulling said lens holder to bias said lens holder in said rearward direction; and a linking mechanism for controlling said extension spring in accordance with movement of said first movable barrel, said linking mechanism shortening said extension spring when said first movable barrel is in said collapsed position to disable said pulling force from occurring, and said linking mechanism extending said extension spring to enable said pulling force to occur when said first movable barrel is in front of said collapsed position according to said forward direction.

2. An optical instrument as defined in claim 1, wherein said first movable barrel is moved from said collapsed position to a first position, and then moved between said first position and a second position, said second position being defined furthest in said forward direction for said first movable barrel.

3. An optical instrument as defined in claim 2, further comprising a first barrel moving mechanism for moving said first movable barrel on said optical axis relative to said body, said holder moving mechanism moving said lens holder in response to operation of said first barrel moving mechanism.

4. An optical instrument as defined in claim 3, wherein said holder moving mechanism includes a cam pin and a cam surface, and a first one of said cam pin and said cam surface is positioned in front of a second one of said cam pin and said cam surface according to said forward direction, and is pressed against said second one by said extension spring.

5. An optical instrument as defined in claim 4, wherein said linking mechanism is structured so that, when said first movable barrel is in front of said first position according to said forward direction, then said linking mechanism is displaced in said forward direction in response to a pull of said extension spring in said forward direction, and that said lens holder is biased in said rearward direction by combination of said extension spring and said linking mechanism.

6. An optical instrument as defined in claim 5, further comprising:

a second movable barrel supported in said first movable barrel in a movable manner on said optical axis in said forward and rearward directions, said front lens group being mounted in said second movable barrel; and a second barrel moving mechanism for moving said second movable barrel relative to said first movable barrel on said optical axis, in response to operation of said first barrel moving mechanism, and in a direction in which said first movable barrel moves relative to said body.

7. An optical instrument as defined in claim 3, wherein said linking mechanism including a spring plate, said spring plate having a fixed end and a free end, said fixed end being secured behind said first movable barrel according to said rearward direction, said free end contacting an inner wall of said body when said first movable barrel is set in said collapsed position, to come nearer to said first movable barrel, said extension spring being connected between said spring plate and said lens holder.

8. An optical instrument as defined in claim 3, wherein said linking mechanism includes:

a compression coil spring; and a shielding plate, disposed behind said first movable barrel according to said rearward direction, supported in a movable manner, and biased by said compression coil spring in said rearward direction, said extension spring being connected between said shielding plate and said lens holder.

9. An optical instrument as defined in claim 8, further comprising a stopper for preventing said shielding plate from moving in said rearward direction beyond a limit position when said first movable barrel is moved to said first position.

10. An optical instrument as defined in claim 9, wherein said stopper includes:

a rod disposed to extend from said shielding plate in said forward direction;

a stopper claw disposed to project from a front end of said rod; and an engaging portion, disposed on said rear end of said first movable barrel, for contacting said stopper claw when said shielding plate is moved to said limit position, to prevent said shielding plate in said rearward direction.

11. An optical instrument, having a body, in which at least one first movable barrel is supported, and is movable on an optical axis in forward and rearward directions, at least a front lens group and a rear lens group are disposed in said first movable barrel and arranged on said optical axis, wherein said first movable barrel is moved from a collapsed position to a wide-angle terminus position in said forward direction, and then moved between said wide-angle terminus position and a telephoto terminus position, said telephoto terminus position being defined furthest in said forward direction for said first movable barrel, said optical instrument comprising:

a first barrel moving mechanism for moving said first movable barrel on said optical axis relative to said body;

a second movable barrel supported in said first movable barrel in a movable manner on said optical axis in said forward and rearward directions;

a second barrel moving mechanism for moving said second movable barrel relative to said first movable barrel on said optical axis, in response to operation of said first barrel moving mechanism;

a lens holder, supported in said second movable barrel in a movable manner on said optical axis in said forward and rearward directions, for supporting said rear lens group;

a holder moving mechanism for moving said lens holder relative to said second movable barrel on said optical axis, in response to operation of said second barrel moving mechanism;

an extension spring for absorbing backlash of said holder moving mechanism, said extension spring causing force of pulling said lens holder to bias said lens holder in said rearward direction; and a linking mechanism for controlling said extension spring in accordance with movement of said second movable barrel, said linking mechanism shortening said extension spring when said first movable barrel is in said collapsed position to disable said pulling force from occurring, and said linking mechanism extending said extension spring to enable said pulling force to occur when said first movable barrel is in front of said collapsed position according to said forward direction.

12. An optical instrument as defined in claim 11, further comprising:

a third movable barrel supported in said second movable barrel in a movable manner on said optical axis in said forward and rearward directions, said front lens group being mounted in said third movable barrel; and a third barrel moving mechanism for moving said third movable barrel relative to said second movable barrel on said optical axis, in response to operation of said second barrel moving mechanism.

13. An optical instrument, having a body, in which at least one movable barrel is supported, and is movable on an optical axis in forward and rearward directions, at least a front lens group and a rear lens group are disposed in said movable barrel and arranged on said optical axis, wherein said movable barrel is moved from a collapsed position to a first position in said forward direction, and then moved between said first position and a second position, said optical instrument comprising:

a lens holder, supported in said movable barrel in a movable manner on said optical axis in said forward and rearward directions, for supporting said rear lens group;

a holder moving mechanism for moving said lens holder relative to said movable barrel on said optical axis;

an extension spring, having a front end secured to said lens holder, for biasing said lens holder in said rearward direction, to absorb backlash of said holder moving mechanism; and a support mechanism, having first and second portions, said first portion being secured to a rear end of said movable barrel, said second portion being secured to a rear end of said extension spring, and shifted in said forward and rearward directions by a relative movement of said body relative to said movable barrel; said second portion being relatively shifted in said forward direction by said body when said movable barrel is in said collapsed position; and said second portion being released from said body and returned in said rearward direction when said movable barrel is between said first and second positions, to return said rear end of said extension spring in said rearward direction.

14. An optical instrument as defined in claim 13, wherein said support mechanism comprises a spring plate, said first portion is a fixed end of said spring plate, said second portion is a free end of said spring plate, and when said movable barrel is in said collapsed position, then said second portion is shifted toward said movable barrel.

15. An optical instrument as defined in claim 14, wherein said spring plate is structured so that, when said movable barrel is between said first and second positions, then said free end of said spring plate is displaced in said forward direction in response to a pull of said extension spring in said forward direction, and that said lens holder is biased in said rearward direction by combination of said extension spring and said spring plate.

16. An optical instrument as defined in claim 13, wherein said second portion is a shielding plate, disposed behind said movable barrel according to said rearward direction, and supported in a movable manner;

said first portion is a compression coil spring, secured between said shielding plate and said movable barrel, and compressed by an inner wall of said body pressing said shielding plate relatively in said forward direction.

17. An optical instrument as defined in claim 16, wherein said compression coil spring is structured so that, when said movable barrel is between said first and second positions, then said compression coil spring is compressed in response to a pull of said extension spring in said forward direction, and that said lens holder is biased in said rearward direction by combination of said extension spring and said compression coil spring.

18. An optical instrument as defined in claim 17, further comprising a stopper for preventing said shielding plate from moving in said rearward direction beyond a limit position when said movable barrel is moved to said first position.

19. A lens apparatus comprising:
  a movable lens barrel movable on an optical axis between a collapsed position and a using position;
  a lens holder supported in said movable lens barrel in a movable manner on said optical axis;
  a spring, having ends respectively connected to said lens holder and said movable lens barrel, for biasing said lens holder in one direction, so as to absorb backlash between said lens holder and said movable lens barrel; and
  means for varying a length between said ends of said spring, said means reducing said length when said movable lens barrel is in said collapsed position, and said means enlarging said length when said movable lens barrel is in said using position, in order to increase force of said spring.

* * * * *